(12) United States Patent
Liu et al.

(10) Patent No.: US 8,118,914 B2
(45) Date of Patent: Feb. 21, 2012

(54) SOLID MATERIALS AND METHOD FOR CO₂ REMOVAL FROM GAS STREAM

(75) Inventors: Zheng Liu, Knoxville, TN (US); Alan W. Ferguson, Knoxville, TN (US); Nareshkumar B. Handagama, Knoxville, TN (US)

(73) Assignee: ALSTOM Technology Ltd., Baden (CH)

( * ) Notice: Subject to any disclaimer, the term of this patent is extended or adjusted under 35 U.S.C. 154(b) by 386 days.

(21) Appl. No.: 12/537,666

(22) Filed: Aug. 7, 2009

(65) Prior Publication Data
US 2010/0154636 A1 Jun. 24, 2010

Related U.S. Application Data

(60) Provisional application No. 61/094,437, filed on Sep. 5, 2008.

(51) Int. Cl.
*B01D 53/62* (2006.01)
*B01J 20/02* (2006.01)
(52) U.S. Cl. ............... 95/139; 96/153; 96/154; 423/230
(58) Field of Classification Search ............ 95/139, 95/900; 96/153, 154; 502/150, 400, 439; 423/220, 228–230
See application file for complete search history.

(56) References Cited

U.S. PATENT DOCUMENTS

| | | | |
|---|---|---|---|
| 2,818,323 A * | 12/1957 | Haensel | .......... 423/228 |
| 4,502,872 A | 3/1985 | Ivester et al. | |
| 4,668,255 A | 5/1987 | Govind | |
| 5,520,894 A * | 5/1996 | Heesink et al. | ........... 423/230 |
| 5,876,488 A | 3/1999 | Birbara et al. | |
| 6,146,605 A | 11/2000 | Spokoyny | |
| 6,280,503 B1 * | 8/2001 | Mayorga et al. | ............. 95/96 |
| 6,547,854 B1 | 4/2003 | Gray et al. | |
| 6,755,892 B2 | 6/2004 | Nalette et al. | |
| 6,759,358 B2 | 7/2004 | Huang et al. | |
| 6,908,497 B1 | 6/2005 | Sirwardane | |
| 2008/0293976 A1 * | 11/2008 | Olah et al. | ............. 568/698 |

FOREIGN PATENT DOCUMENTS

| | | |
|---|---|---|
| EP | 0 162 536 | 11/1985 |
| EP | 1 145 755 | 10/2001 |
| WO | WO 02/13948 | 2/2002 |
| WO | WO 2008/140788 | 11/2008 |

OTHER PUBLICATIONS

PCT International Search Report and The Written Opinion of the International Searching Authority dated Apr. 12, 2009—(PCT/US2009/055474).
Article—"CO2 capture by amine-enriched fly ash carbon sorbents", by M.L. Gray et al., published iin Separation and Purification Technology 35 (2004) 31-36.

* cited by examiner

*Primary Examiner* — Frank Lawrence, Jr.
(74) *Attorney, Agent, or Firm* — Rita D. Vacca (57) ABSTRACT

A system (10) for removing carbon dioxide from a process gas generated during the combustion of a fuel comprises at least one absorption vessel (12, 14) through which the process gas may be forwarded. The absorption vessel (12, 14) is provided with a sorbent material (50) which is operative for reversibly collecting carbon dioxide from the process gas being forwarded through the sorbent material (50). The sorbent material (50) comprises at least one amine, at least one carbon dioxide activating catalyst, and at least one porous material supporting the at least one catalyst and the at least one amine.

23 Claims, 4 Drawing Sheets

IIIb-IIIb

SOLID MATERIALS AND METHOD FOR CO₂ REMOVAL FROM GAS STREAM

CROSS-REFERENCE TO RELATED APPLICATION

This application claims the benefit of U.S. Provisional Patent Application Ser. No. 61/094,437 filed Sep. 5, 2008, which is hereby incorporated by reference in its entirety.

FIELD OF THE INVENTION

The present invention relates to a system for removing carbon dioxide from a process gas generated during the combustion of a fuel, said system comprising at least one absorption vessel through which the process gas may be forwarded, said absorption vessel being provided with a sorbent material which is operative for reversibly collecting carbon dioxide from the process gas being forwarded through the sorbent material.

The present invention further relates to a method of forming a sorbent material, and a method of removing carbon dioxide from a process gas generated during the combustion of a fuel.

BACKGROUND OF THE INVENTION

In the combustion of a fuel, such as coal, oil, peat, waste, etc., in a combustion plant, such as a power plant, a hot process gas is generated, such process gas containing, among other components, water vapour, nitrogen, and carbon dioxide, $CO_2$.

In view of the increasing environmental concerns in connection with the release of carbon dioxide to the atmosphere several systems for removing carbon dioxide from process gas have been proposed. One such system is disclosed in U.S. Pat. No. 6,755,892. The system of U.S. Pat. No. 6,755,892 comprises two parallel sorbent beds, each of which is provided with a sorbent. Carbon dioxide is captured, at a low temperature, in one of the beds, while the other bed is regenerated, at a high temperature, to release carbon dioxide which may subsequently be forwarded to a carbon dioxide storage facility. However, high-pressure drop over the sorbent beds, and poor $CO_2$ removal efficiency makes the system of U.S. Pat. No. 6,755,892 less efficient in applications of higher gas flow rates, such as those of power stations, such as for example coal-fired power stations, in which there is a high $CO_2$ concentration in the process gas and a high gas flow rate.

SUMMARY OF THE INVENTION

An object of the present invention is to provide a system for efficient removal of carbon dioxide from a process gas generated during the combustion of a fuel.

This object is achieved by a system for removing carbon dioxide from a process gas generated during the combustion of a fuel, said system comprising at least one absorption vessel through which the process gas may be forwarded, said absorption vessel being provided with a sorbent material which is operative for reversibly collecting carbon dioxide from the process gas being forwarded through the sorbent material, wherein said sorbent material comprises at least one amine, at least one carbon dioxide activating catalyst, and at least one porous material supporting the at least one catalyst and the at least one amine.

An advantage of this system is that the removal of carbon dioxide becomes very efficient, i.e., a comparably small volume of sorbent material may absorb a large amount of carbon dioxide in a short period of time. The small volume of sorbent material required does not only decrease the investment cost of the system for removing carbon dioxide, compared to the investment cost of the systems of the prior art, but also reduces the pressure drop experienced by the process gas passing through the absorption vessel. The reduced pressure drop reduces the operating cost due to the reduced fan power required to draw the process gas through the absorption vessel.

According to one embodiment the at least one carbon dioxide activating catalyst comprises a catalyst selected from the group of catalysts comprising organo-metallic complex catalysts, inorganic metal complex catalysts, metal oxides, and metal halides. These catalyst types have been found to be efficient in improving the absorption and desorption of carbon dioxides on amines. According to one preferred embodiment the at least one carbon dioxide activating catalyst comprises a catalyst selected from the group of catalysts comprising organic transition metal complex catalysts, and inorganic transition metal complex catalysts. Such catalysts have been found to be very efficient in promoting the absorption and desorption of carbon dioxide on amines.

According to one embodiment the at least one amine comprises a secondary amine. According to another embodiment the at least one amine comprises an amine having at least one hydroxyl group. According to one preferred embodiment the at least one amine comprises a secondary amine having at least two hydroxyl groups. Amines of these types have been found to be particularly efficient in the absorption and desorption of carbon dioxide when such absorption and desorption is promoted by a catalyst activating the carbon dioxide and, hence, making the carbon dioxide more susceptible for being absorbed on, or desorbed from, the amine.

According to one embodiment the porous material supporting the at least one carbon dioxide activating catalyst and the at least one amine has a specific BET area of at least 50 $m^2/g$. Such a porous material has been found to be very efficient in efficiently bringing the carbon dioxide into contact with the catalyst and the amine. According to one preferred embodiment the at least one porous material has a specific BET area of 100-1000 $m^2/g$.

According to one embodiment the at least one carbon dioxide activating catalyst also works as a porous material supporting the at least one amine. An advantage of this embodiment is that fewer components are required, since the catalyst functions, in addition to its catalytic activity, as a porous material, with high BET area, onto which the amine may be supported. Examples of such catalysts functioning also as the porous material include MgO and alkali modified zeolites and clays.

According to one embodiment the porous material supporting the catalyst and the amine is provided as a sorbent layer on a substrate. An advantage of this embodiment is that the sorbent layer applied to the substrate provides for efficient contact with the process gas, without increasing the pressure drop. Hence, the porous material provides for efficient contact between process gas, amine and catalyst on a micro-scale level, while the support provides for efficient transport of the process gas through the sorbent material on a macro-scale level.

According to one embodiment the substrate forms at least a part of at least one channel which is operative for receiving at least a portion of the flow of the process gas. An advantage of this embodiment is that the flue gas may be forwarded through said channel under good contact with the catalyst and the amine, still resulting in a low pressure drop, which provides for low operating costs, also in cases of the large process gas flow rates of a power plant. According to one embodiment the substrate forms a monolithic unit. Monolithic units are effective for obtaining good contact between process gas and sorbent layers formed inside the monolithic unit, and a low pressure drop. According to one preferred embodiment the monolithic unit is a flow-through monolithic unit. An advantage of this embodiment is that flow-through monolithic units have a particularly low pressure drop. According to another preferred embodiment the monolithic unit is a wall-flow monolithic unit. An advantage of this embodiment is that a particularly good contact between the process gas and the sorbent layer on the walls of the monolithic unit is obtained when the process gas flows straight through the walls and the sorbent layers.

According to one preferred embodiment the substrate is a structured packing comprising at least one turbulence promoting device. An advantage of this embodiment is that a good contact between the process gas and the sorbent layer provided on the walls of the structured packing is obtained, without causing a significant pressure drop in the process gas.

A further object of the present invention is to provide an efficient method of forming a sorbent material which is efficient for reversible absorption of carbon dioxide from a process gas generated during the combustion of a fuel.

This object is achieved by means of a method of forming a sorbent material adapted for reversible absorption of carbon dioxide in an absorption vessel through which a process gas generated during the combustion of a fuel may be forwarded, the method comprising forming said sorbent material by immobilizing at least one amine, and at least one carbon dioxide activating catalyst, on at least one porous material.

An advantage of this method is that effective sorbent materials yielding low pressure drops in the process gas may be formed in an efficient manner.

According to one embodiment the at least one amine and the at least one carbon dioxide activating catalyst are co-immobilized on the porous material. One advantage of co-immobilizing the catalyst and the amine in one single step is that fewer process steps are required. A further advantage is that it is easier to obtain a good mixing and distribution of the catalyst and the amine when they are immobilized on the porous material in a single step.

According to one embodiment the porous material comprising the at least one amine and the at least one carbon dioxide activating catalyst immobilized thereon is coated on a substrate to form a sorbent layer thereon. An advantage of this embodiment is that the porous material provides for efficient contact between process gas, amine and catalyst on a micro-scale level, and the support provides for efficient transport of the process gas through the sorbent material on a macro-scale level.

According to one embodiment the porous material is coated on a substrate before immobilizing the at least one amine and the at least one carbon dioxide activating catalyst thereon.

According to one embodiment the process of forming a sorbent material comprises the steps of
  A) forming a slurry of the porous material, a solvent, and a binder,
  B) applying said slurry to a substrate, followed by drying, and then calcining at a temperature of 200-1000° C.,
  C) impregnating the at least one amine and the at least one carbon dioxide activating catalyst onto the porous material, and
  D) drying said substrate to obtain said sorbent material.

Optionally, a step E), succeeding step D), may be included, said step E) including calcining the substrate with the catalyst and the amine applied to the porous material at a temperature of 200-1000° C. Optionally, the drying in step B) may occur at a temperature of 20-150° C. Optionally, the drying in step D) may occur at a temperature of 20-150° C.

According to another embodiment the process of forming a sorbent material comprises the steps of
  A) wet impregnating the at least one carbon dioxide activating catalyst on the porous material,
  B) drying the porous material,
  C) forming a slurry of said porous material, a solvent, and a binder,
  D) applying said slurry to a substrate,
  E) drying said substrate followed by calcining the substrate at a temperature of 200-1000° C. to immobilize the porous material thereon,
  F) wet impregnating the at least one amine on the porous material immobilized onto the substrate, and
  G) drying the substrate to obtain said sorbent material.

Optionally, the step B) of this method may additionally include, subsequently to the step of drying the porous material, a step of calcining the porous material at a temperature of 200-1000° C. Optionally, the drying of the porous material in step B) may occur at a temperature of 20-150° C. Optionally, the drying of said substrate in step E) may occur at a temperature of 20-150° C. Optionally, the drying of said substrate in step G) may occur at a temperature of 20-200° C.

A sorbent material adapted for reversible absorption of carbon dioxide in an absorption vessel through which a process gas generated during the combustion of a fuel may be forwarded, may, in accordance with a further aspect, be formed by immobilizing at least one amine on at least one porous material comprising a carbon dioxide activating catalyst.

Immobilizing an amine on a material comprising both the properties of a porous material, and of a suitable catalytic activity, provides a simple manner of producing a sorbent material.

A still further object of the present invention is to obtain an efficient method of removing carbon dioxide from a process generated during the combustion of a fuel.

This object is achieved by means of a method of removing carbon dioxide from a process gas generated during the combustion of a fuel, said method comprising bringing the process gas into contact with a sorbent material which is operative for reversibly collecting carbon dioxide from the process gas, said method including bringing said process gas into contact with a sorbent material comprising at least one amine, at least one carbon dioxide activating catalyst, and at least one porous material supporting the at least one catalyst and the at least one amine, such that carbon dioxide is absorbed by said at least one amine under the influence of said at least one carbon dioxide activating catalyst.

Further objects and features of the present invention will be apparent from the description and the claims.

BRIEF DESCRIPTION OF THE DRAWINGS

The invention will now be described in more detail with reference to the appended drawings in which:

FIG. 2b is a schematic cross-section of the monolithic unit, as seen in the direction of the arrows IIb-IIb of FIG. 2a.

FIG. 2c is an enlarged schematic cross-section of a wall of the monolithic unit of FIG. 2a.

FIG. 3b is a schematic cross-section of the monolithic unit, as seen in the direction of the arrows IIIb-IIIb of FIG. 3a.

FIG. 3c is an enlarged schematic cross-section of a wall of the monolithic unit of FIG. 3a.

FIG. 4b is a side view of a plate of the structured packing of FIG. 4a.

DESCRIPTION OF PREFERRED EMBODIMENTS

Figure 1:
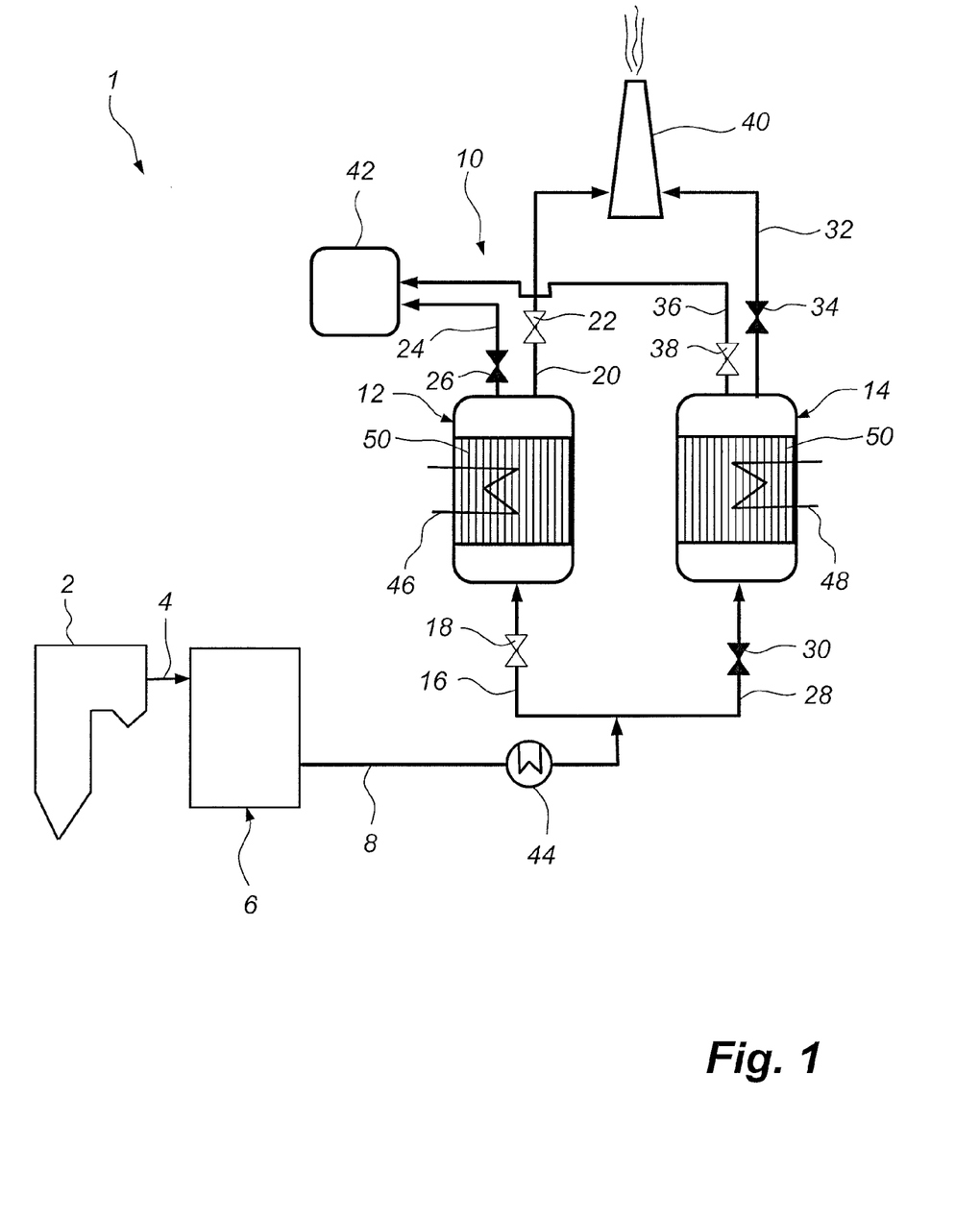
FIG. 1 is a schematic side view of a power plant comprising a system for removing carbon dioxide from a process gas.

FIG. 1 is a schematic side view and illustrates a power plant 1. The power plant 1 is provided with a boiler 2 in which a fuel, such as coal, oil, peat, or waste, is combusted under generation of heat. The combustion also generates a hot process gas, which is often referred to as a flue gas. The flue gas leaves the boiler 2 via a duct 4 and is forwarded to a gas cleaning system 6. The gas cleaning system 6 is of a per se known type, and may comprise a fly ash removal device, such as an electrostatic precipitator, an example of which is illustrated in U.S. Pat. No. 4,502,872, a wet scrubber, such as that disclosed in EP 0 162 536, for removing sulphur dioxide and hydrochloric acid, and a selective catalytic reduction unit, such as that disclosed in U.S. Pat. No. 6,146,605, for removing nitrogen oxides. Hence, the flue gas leaving the gas cleaning system 6 via a duct 8 comprises mainly carbon dioxide gas, nitrogen gas, and water vapour.

The flue gas is then forwarded to a carbon dioxide removal system 10. The main components of the carbon dioxide removal system 10 is a first absorber vessel 12 and a second absorber vessel 14. The two absorber vessels 12, 14 are identical in design and operate in a parallel mode, with one of the absorber vessels being in absorption mode absorbing carbon dioxide from the flue gas, and the other absorber vessel being in desorption mode releasing carbon dioxide, such that the carbon dioxide removal capacity is regenerated. The first absorber vessel 12 is provided with a flue gas supply duct 16, which is provided with a shut off valve 18, a flue gas disposal duct 20, which is provided with a shut off valve 22, and a carbon dioxide disposal duct 24, which is provided with a shut off valve 26. Similarly, the second absorber vessel 14 is provided with a flue gas supply duct 28, which is provided with a shut off valve 30, a flue gas disposal duct 32, which is provided with a shut off valve 34, and a carbon dioxide disposal duct 36, which is provided with a shut off valve 38.

In the instance illustrated in FIG. 1, the first absorber vessel 12 is in absorption mode and is operative for absorbing carbon dioxide from the flue gas. Hence, the valve 18 is open to allow flue gas from the duct 8 to enter the absorber vessel 12 via the flue gas supply duct 16. Furthermore, the valve 22 is open, such that flue gas, from which carbon dioxide has been, at least partly, removed, may leave the first absorber vessel 12 via the flue gas disposal duct 20, via which the flue gas may be emitted to the ambient air via a stack 40. The valve 26 is closed. The second absorber vessel 14 is in desorption mode, and is operative for desorption of carbon dioxide that has previously been removed from the flue gas. Hence, the valve 30 is closed, such that no flue gas can enter the absorber vessel 14 via the flue gas supply duct 28. The valve 34 is also closed, such that no gas may leave the absorber vessel 14 via the flue gas disposal duct 32. Furthermore, the valve 38 is open, such that carbon dioxide, which has been released from the second absorber vessel 14, may leave the vessel 14 via the carbon dioxide disposal duct 36. The carbon dioxide disposal duct 36 forwards the carbon dioxide to a carbon dioxide storage tank 42, in which the carbon dioxide is stored until it is finally disposed of.

The two absorption vessels 12, 14 are operated in an alternating manner, such that one absorption vessel collects carbon dioxide from the flue gas, while the other absorption vessel is regenerated. Hence, when one absorption vessel is full with carbon dioxide it is taken off-line for regeneration, and the other absorption vessel, which has just been regenerated, is taken on-line.

The removal of carbon dioxide from the flue gas is effectuated under a reduced temperature, and to this end a cooler 44 is installed in the flue gas duct 8 to cool the flue gas prior to allowing it to enter the respective absorption vessel 12, 14. Typically, the temperature inside the respective vessel 12, 14 is 20-50° C. during the absorption mode. The regeneration of the absorption vessels, is, on the other hand, effected under an elevated temperature. Hence, the first absorption vessel 12 is provided with a heater 46, and the second absorption vessel 14 is provided with a heater 48. At the instance illustrated in FIG. 1, the heater 46 is inactive, while the heater 48 is active to effect regeneration of the second absorption vessel 14. Typically, the temperature inside the respective vessel 12, 14 is 60-150° C. during the desorption mode.

Each absorption vessel 12, 14 is provided with a solid sorbent material 50, which will now be described in more detail.

Figure 2A:
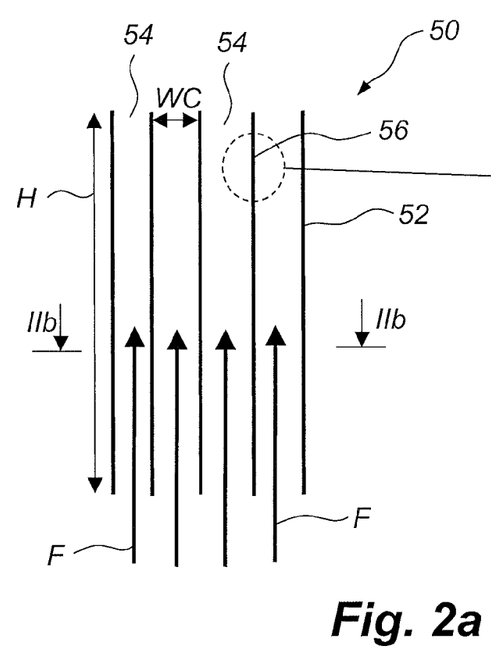
FIG. 2a is a schematic cross-section of a monolithic unit being operative for absorption and desorption of carbon dioxide.
Figure 2B:
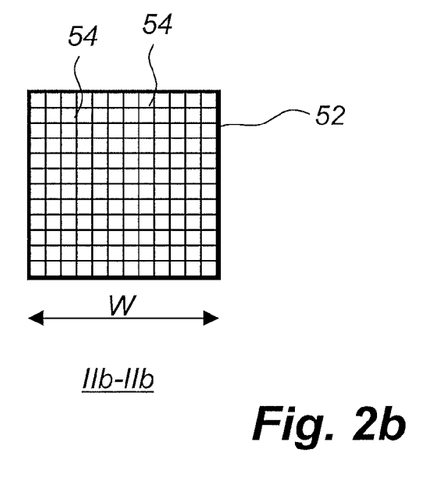

FIG. 2a is an enlarged cross-sectional side view of the sorbent material 50. The sorbent material 50 comprises a monolithic unit 52 having a number of channels 54 through which the gas, illustrated as F in FIG. 2a, can flow. Hence, the monolithic unit 52 is of the so-called flow-through type. In the absorption mode the gas F is flue gas, and in the desorption mode the gas F is carbon dioxide. FIG. 2b is a cross-section illustrating the monolithic unit 52 as seen along the line IIb-IIb of FIG. 2a. The unit 52 may have a square section, as illustrated in FIG. 2b, or may, as alternative, have a circular section or another shape which is suitable for packing into the absorption vessels 12 and 14. The channels 54 may have a square section, with a width WC, illustrated in FIG. 2a, of typically 1-5 mm. As alternative the channels may, for example, have a rectangular, triangular, or circular cross-section. Typically the height H of the monolithic unit 52 is 50-2000 mm, more often the height H is less than 250 mm, and the width W, as best illustrated in FIG. 2b, is typically 40-600 mm. The sorbent material 50 could comprise one single monolithic unit 52, but could, which is often more preferable, comprise a number of monolithic units that have been packed together in the respective absorption vessel 12, 14.

Figure 2C:
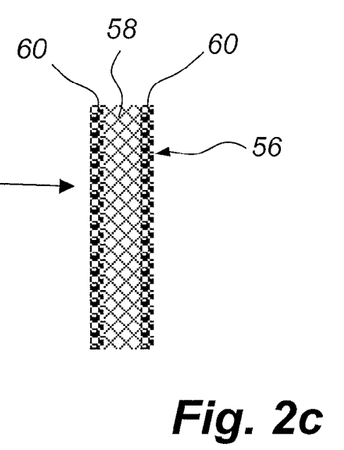

FIG. 2c illustrates an enlarged portion of a wall 56 of the monolithic unit 52. The central portion of the wall 56 is a substrate 58. The substrate 58 contributes to the physical strength of the unit 52, and also provides a large surface area yielding an effective contact with the gas F. On both sides of the substrate 58 a sorbent layer 60 is provided. The sorbent layer 60 comprises an amine and a catalyst that have been immobilized on a porous material to form a washcoat which has then been applied to the substrate 58, in manner which will be described in more detail hereinafter, to form said sorbent layer 60.

When the flue gas passes, in the absorption mode, through the channels 54 of the monolithic unit 52, the carbon dioxide of the flue gas will be effectively absorbed on the amine of the sorbent layer 60 thanks to the large surface area of the porous material of the sorbent layer 60 and the catalyst included in the sorbent layer 60 making such absorption efficient. When the temperature of the monolithic unit 52 is raised, in the desorption mode, the carbon dioxide will be effectively released from the amine of the sorbent layer 60 thanks to the large surface area of the porous material of the sorbent layer 60 and the catalyst included in the sorbent layer 60 making such desorption efficient. Hence, the sorbent layer 60 makes both absorption and desorption of carbon dioxide in the sorbent material 50 efficient in comparison to the prior art.

Figure 3A:
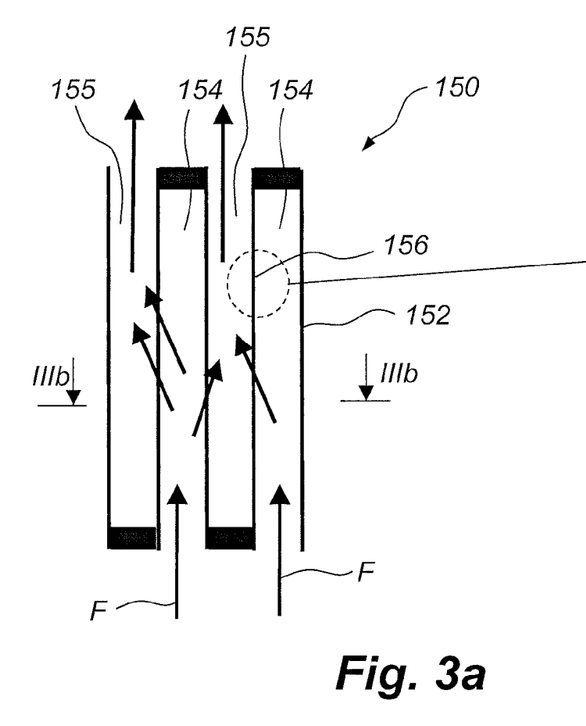
FIG. 3a is a schematic cross-section of a monolithic unit according to an alternative embodiment.
Figure 3B:
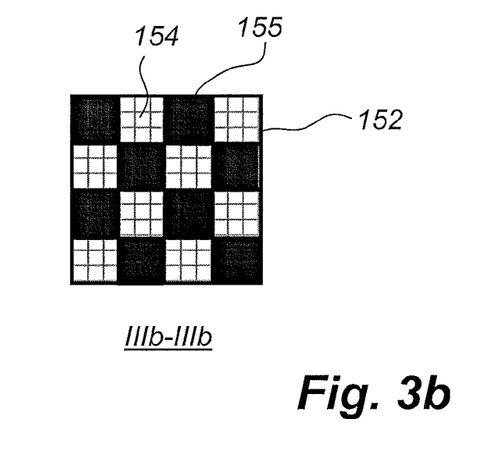

FIG. 3a is an enlarged cross-sectional side view of an alternative sorbent material 150. The sorbent material 150 comprises a monolithic unit 152 which is of the so-called wall-flow type and which has a first type of channels 154 and a second type of channels 155, the channels 154 and 155 being arranged in an alternating manner in the monolithic unit 152, as illustrated in FIGS. 3a and 3b. The channels 154 of the first type are blocked at their upper ends, and the channels 155 of the second type are blocked at their lower ends, which is also illustrated in FIG. 3b, which is a cross-section, as seen in the direction of the arrows IIIb-IIIb of FIG. 3a. The gas, illustrated as F in FIG. 3a, cannot, in contrast to what has been illustrated hereinbefore with reference to FIG. 2a, flow through the channels, but has two flow through the actual walls 156, as is illustrated in FIG. 3a.

Figure 3C:
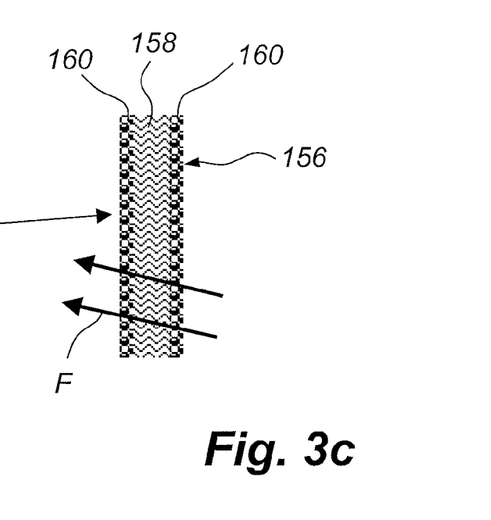

FIG. 3c illustrates an enlarged portion of a wall 156 of the monolithic unit 152. The central portion of the wall 156 is a substrate 158, which is porous enough to allow the gas F to flow there through and which is, on both sides thereof, provided with sorbent layers 160, having the same properties and function as the sorbent layer 60 described hereinbefore. As can be seen the gas flows through the wall 156, thus resulting in an efficient contact between the sorbent layers 160 and the gas F. It will be appreciated that the substrate 158 may, as alternative, be provided with a sorbent layer 160 on only one side thereof.

Monolith units of the above referenced types are available from, among other suppliers, Corning Incorporated Environmental Technologies, New York, U.S.A.

Figure 4A:
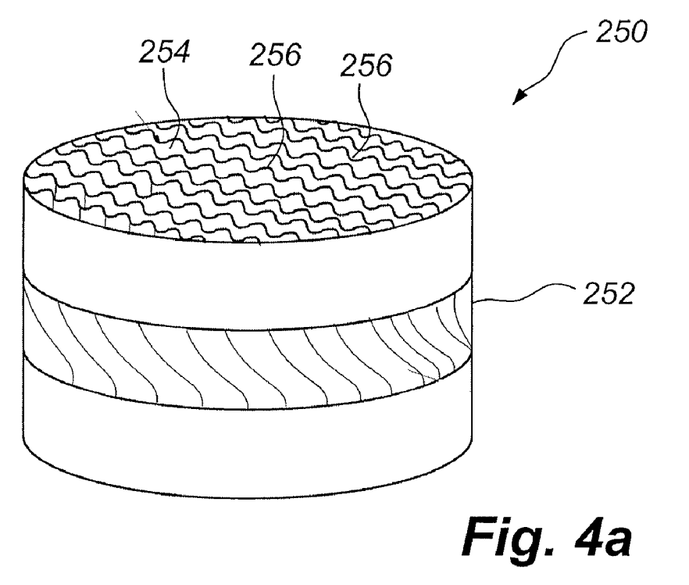
FIG. 4a is three-dimensional view of a structured packing being operative for absorption and desorption of carbon dioxide.
Figure 4B:
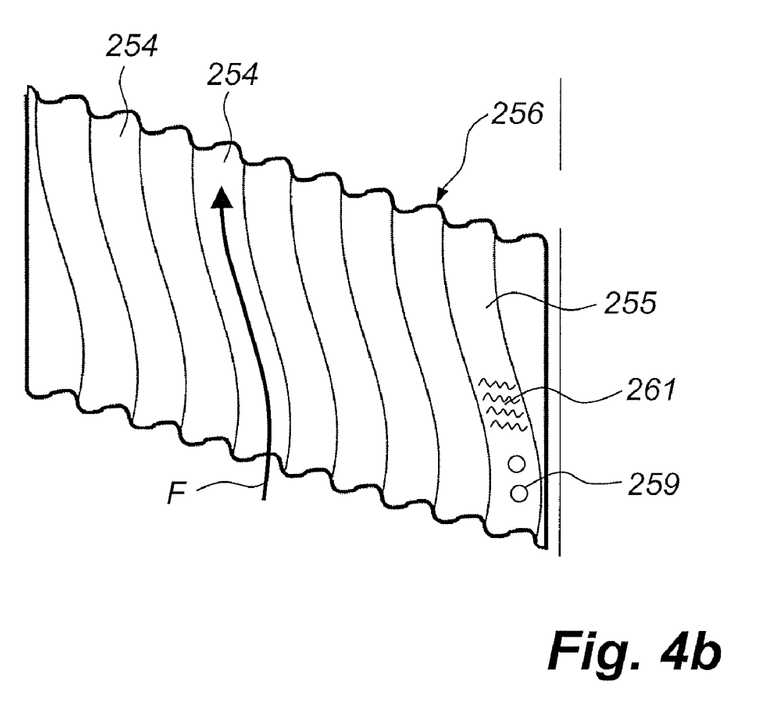

FIG. 4a is an enlarged cross-sectional side view of an alternative sorbent material 250. The sorbent material 250 comprises a structured packing 252. The structured packing comprises a number of walls or plates 256 that have been packed together. The plates 256 have, as is best illustrated in FIG. 4b illustrating a single plate 256, a patterned surface 255. A number of plates 256 packed together will form between them channels 254 in which the gas, illustrated as F in FIG. 4b, may flow. Such channels may be angled, wave shaped, as is illustrated in FIG. 4b, or have any other suitable form. The shape of the channels 254 may in itself provide a turbulence to the flue gas, thereby increasing the contact between the gas and a sorbent layer that has been provided on the plates 256, said sorbent layer being similar to the sorbent layer 60 described hereinbefore with reference to FIG. 2c. Hence, the channels 254 may themselves be turbulence promoting devices. As alternative, or in addition to, the shape of the channels 254, the plates 256 may also be provided with other turbulence promoting devices, such as openings 259 and textured portions 261.

The plates 256 could be made of steel, plastics, ceramics or another suitable material, which may form a substrate onto which a sorbent layer, of the sorbent layer type 60 described hereinbefore with reference to FIG. 2c, may be applied.

Examples of suitable structured packing types that can be utilized as substrate for a sorbent layer being operative for absorption and desorption of carbon dioxide include the FLEXIPAC and INTALOX structured packing types that are available from Koch-Glitsch LP, Wichita, Kans., USA.

The sorbent layer 60 described hereinbefore with reference to FIG. 2c may, in a preferred embodiment, comprise the following components:

1) the porous material having a high specific surface area
2) the amine; and
3) the catalyst which is able to promote the interaction of amine with carbon dioxide; wherein the amine and the catalyst are preferably co-immobilized onto the porous material.

The porous material is a solid material that preferably has a specific area, defined as a specific BET area, which may be measured in accordance with the standard ASTM C1069-09, of at least 50 $m^2/g$, more preferably a specific BET area of 100-1000 $m^2/g$. The porous material with a high specific BET area may, for example, be an oxide (such as alumina, $Al_2O_3$, or quartz, $SiO_2$), a zeolite, a clay, an ion-exchanged resin, a molecular sieve material, a base- and/or acid-modified clay, or a polymeric absorbent resin, such as an acrylic ester polymer, polystyrene divinyl benzene and mixtures thereof.

The amine may be any type that is suitable for absorption and desorption of carbon dioxide. The chemistry behind absorption and desorption of carbon dioxide on amines is per se known, and is disclosed in, for example, the article "$CO_2$ capture by amine-enriched fly ash carbon sorbents", by M. L. Gray et al, published in *Separation and Purification Technology* 35 (2004) 31-36, Elsevier B. V.

The amine may be a primary, a secondary, or a tertiary amine, or mixtures thereof. A primary amine has one of three hydrogen atoms in ammonia replaced by an organic substituent bound to the nitrogen atom. A secondary amine has two organic substituents bound to the nitrogen atom together with one hydrogen atom. In tertiary amines all three hydrogen atoms are replaced by organic substituents bonded to the nitrogen atom. The amine is preferably a secondary amine, or a mixture of a secondary amine together with a primary and/or a tertiary amine. More preferably, a secondary amine including a plurality of hydroxyl (—OH) groups, as is disclosed in U.S. Pat. No. 5,876,488, is included in the sorbent layer 60. In addition to efficient absorption and desorption of carbon dioxide, the amine should preferably have a low volatility, such that the amine is not easily volatilized and lost from the sorbent layer 60 during the absorption and/or desorption mode of the respective absorber vessel 12, 14. Preferably, the partial pressure of the amine is lower than about 0.05 mm Hg at 20° C. and at the operating pressure of the absorption vessel, more preferably lower than about 0.01 mmHg at those conditions. It will be appreciated that the volatilization is normally higher during the desorption mode, due to the higher temperature, and that keeping the desorption temperature as low as possible, in view of the time available for the desorption process, is an important aspect in keeping the loss of amine as low as possible to obtain a long service life of the sorbent material 50. Furthermore, the amine should preferably have a low toxicity to the environment, and to humans. Amines that are particularly suitable for incorporation in the sorbent layer 60 are amines that are secondary amines and/or amines that include alcohol (OH) functionality, examples of such amines being diethanolamine (DEA), diisopropanolamine (DIPA), and 2-hydroxyethyl piperazine (HEP).

The catalyst, which may be referred to as a carbon dioxide activating catalyst, is effective for activating carbon dioxide and making carbon dioxide, $CO_2$, molecules more available for reacting with the amine in the absorption mode, or more available for being released from the amine in the desorption mode. Thus, the catalyst is a compound which is able to adsorb and activate $CO_2$ molecules. Such a catalyst may be improved by doping additional components to enhance the performance of the catalyst. Hence, the catalyst works by providing a different transition state and a lower activation energy in the absorption of carbon dioxide on the amine, compared to a non-catalyzed absorption. Furthermore, the catalyst also provides a different transition state and a lower activation energy in the desorption of carbon dioxide from the amine, compared to a non-catalyzed desorption.

The catalyst could be a homogeneous and/or a heterogeneous type catalyst. The catalyst is preferably a material with proper base strength, such as MgO, and BaO, alkali (lithium, sodium, potassium, rubidium, cesium)-modified zeolite or clay, or an organo-metallic complex, such as nickel bipyridine.

A homogeneous type catalyst may include, for example, an organic- and/or inorganic metallic complex comprising a transition metal, such as nickel, Ni, and one or more inorganic and/or organic ligands, such ligands including, for example, bi-pyridine, an aromatic group, such as phenyl, and/or a halogen group, such as chlorine, Cl. The organic- and/or inorganic transition metal complex of such a homogenous catalyst is a very efficient manner of activating the inert $CO_2$ molecules. Coordination of the ligands around the transition metal results in a change of reactivity of the ligands and creates favourable steric conditions for ligand interaction with the carbon dioxide molecules to activate them. One example of a suitable organic- and/or inorganic transition metal complex catalyst includes a halogen-type complex, Ni(bipyridine)$_3$Cl$_2$.

A heterogeneous catalyst may include, for example, metals or their compounds such as oxides and halides, including, for example, chlorides. Examples of such heterogeneous catalysts include MgO and $MgCl_2$.

In accordance with one embodiment the catalyst is of a type which also can be used as porous material. Examples of such catalysts include magnesium oxide, MgO, alkali (lithium, sodium, potassium, rubidium, cesium)-modified zeolite or clay, which may have the combined effect of acting as a catalyst and as a porous material on which the amine is immobilized.

The porous material, the amine, and the catalyst may be applied on the substrate 58 to form said sorbent layer 60 by means of the so-called washcoating method, which is per se known from other technical areas, as disclosed in U.S. Pat. No. 6,759,358.

In a first step of the washcoating method, the catalyst, such as Ni(bipyridine)$_3$Cl$_2$, and the amine, such as diethanolamine (DEA), are co-immobilized on the porous material, which could be an acrylic ester polymer, or alumina, $Al_2O_3$. In the process of co-immobilizing the catalyst and the amine on the porous material a mixture is formed from said catalyst, said amine, a solvent, such as water and/or ethanol, and potentially modifiers, such as $Ba^{2+}$, $Na^+$, $K^+$, $NH_3$. The mixture is then wet impregnated onto the porous material, which is subsequently dried at a temperature of, preferably, 20-150° C., more preferably a temperature in the range of 50-120° C. Subsequent to the drying process, the porous material is calcined at a temperature which is higher than the drying temperature. Typically, the calcination step occurs at a temperature of 200-1000° C., often in the range of 200-700° C., the exact temperature depending on the type of porous material, catalyst and amine. U.S. Pat. No. 5,876,488 discloses one method of immobilizing an amine on an acrylic ester polymer. A similar method could be employed also in the present invention, with the difference that the solution applied on the acrylic ester polymer would also contain the catalyst.

In a second step of the washcoating process, a slurry is formed from the porous material, onto which the amine and the catalyst have been impregnated, and a solvent, such as water. The slurry may also contain a binder. One example of a binder which is suitable for binding the porous material to a substrate is $Al_2O_3$. The slurry is then applied to the walls 56 of the channels 54 of, for example, a monolithic unit 52, 152, or a structured packing 252. The monolithic unit, or the structured packing, is preferably made of a ceramic, a steel material or a plastic material. The application of the slurry may be achieved by dipping a monolithic unit or a structured packing into a vessel containing said slurry. Other application techniques are also possible, including spraying said slurry into the channels. Finally, the monolithic unit 52 is dried, typically at a temperature of 20-150° C., followed by calcination at a higher temperature, typically 200-700° C., to evaporate the solvent, leaving only the porous material, onto which the amine and the catalyst have been impregnated, on the walls 56, said porous material, onto which the amine and the catalyst have been impregnated, forming said sorbent layer 60.

In an alternative method of preparing the sorbent material, the porous material may, in a first step, be coated on a substrate, such as a monolithic unit, such coating including forming a slurry of the porous material, a solvent, and a binder, such as $Al_2O_3$, and applying said slurry to the monolithic unit, followed by drying and calcination at the temperatures indicated hereinbefore. Then, after the porous material has already been coated on the monolithic unit, the amine and the catalyst are, in a second step, immobilized on the porous material, being already in place on the monolithic unit. Such immobilization may be performed by forming a mixture of said amine and said catalyst in a solvent, such as water and/or ethanol, and applying said mixture to the substrate carrying thereon the porous material. The substrates is dried, for example at a temperature of 20-150° C., leaving the amine and the catalyst immobilized on the porous material.

In a still further alternative method, the amine is immobilized on the porous material in one process operation, and the catalyst is coated on the porous material in another process operation, being separate from the process operation of immobilizing the amine.

In a yet further alternative method, the at least one carbon dioxide activating catalyst is, in a first step, wet impregnated on the porous material. The porous material is then dried, for example at a temperature of 20-150° C., and optionally calcined, for example at a temperature of 200-1000° C. A slurry is then formed from the porous material, carrying thereon the catalyst, a solvent, such as water and/or ethanol, and a binder, such as $Al_2O_3$. The slurry is applied to a substrate, such as a monolithic unit or a structured packing. Then the substrate is dried, for example at a temperature of 20-150° C., followed by calcining the substrate at a temperature of 200-1000° C. to immobilize the porous material thereon. Then the at least one amine is wet impregnated on the porous material immobilized onto the substrate. Finally, the substrate is dried at a temperature of, for example, 20-200° C. to obtain said sorbent material.

It will be appreciated that numerous variants of the embodiments described above are possible within the scope of the appended claims.

Above it has been described that the power plant 1 is provided with two parallel absorption vessels 12, 14. It will be appreciated that a power plant may also be provided with 3, 4 or even more parallel absorption vessels. The number of absorption vessels is determined by such factors as the need for redundance, the time for desorption of carbon dioxide versus the time for absorption of carbon dioxide etc. It is also possible, but less preferred, to operate with one single vessel. In the latter case the power plant would need to be shut down during the desorption mode, or the process gas would need to be released via a by-pass without any carbon dioxide being removed therefrom during the desorption mode.

The invention claimed is:

1. A system for removing carbon dioxide from a process gas generated during the combustion of a fuel, said system comprising at least one absorption vessel through which the process gas may be forwarded, said absorption vessel being provided with a sorbent material which is operative for reversibly collecting carbon dioxide from the process gas being forwarded through the sorbent material, said sorbent material comprising at least one amine, at least one carbon dioxide activating catalyst, and at least one porous material supporting the at least one catalyst and the at least one amine.

2. A system according to claim 1, wherein the at least one carbon dioxide activating catalyst comprises a catalyst selected from the group of catalysts comprising organo-metallic complex catalysts, inorganic metal complex catalysts, metal oxides, and metal halides.

3. A system according to claim 2, wherein the at least one carbon dioxide activating catalyst comprises a catalyst selected from the group of catalysts comprising organic transition metal complex catalysts, and inorganic transition metal complex catalysts.

4. A system according to claim 1, wherein the at least one amine comprises a secondary amine.

5. A system according to claim 1, wherein the at least one amine comprises an amine having at least one hydroxyl group.

6. A system according to claim 1, wherein the at least one amine comprises a secondary amine having at least two hydroxyl groups.

7. A system according to claim 1, wherein the at least one porous material supporting the at least one carbon dioxide activating catalyst and the at least one amine has a specific BET area of at least 50 $m^2/g$.

8. A system according to claim 7, wherein the at least one porous material has a specific BET area of 100-1000 $m^2/g$.

9. A system according to claim 1, wherein the at least one carbon dioxide activating catalyst also works as a porous material supporting said at least one amine.

10. A system according to claim 1, wherein the porous material supporting the at least one carbon dioxide activating catalyst and the at least one amine is provided as a sorbent layer on a substrate.

11. A system according to claim 10, wherein the substrate forms at least a part of at least one channel which is operative for receiving at least a portion of the flow of the process gas.

12. A system according to claim 11, wherein the substrate forms a monolithic unit.

13. A system according to claim 12, wherein the monolithic unit is a flow-through monolithic unit.

14. A system according to claim 12, wherein the monolithic unit is a wall-flow monolithic unit.

15. A system according to claim 11, wherein the substrate is a structured packing comprising at least one turbulence promoting device.

16. A method of forming a sorbent material adapted for reversible absorption of carbon dioxide in an absorption vessel through which a process gas generated during the combustion of a fuel may be forwarded, said method comprising forming said sorbent material by immobilizing at least one amine, and at least one carbon dioxide activating catalyst, on at least one porous material.

17. A method according to claim 16, wherein the at least one amine and the at least one carbon dioxide activating catalyst are co-immobilized on the porous material.

18. A method according to claim 16, wherein the porous material comprising the at least one amine and the at least one carbon dioxide activating catalyst immobilized thereon is coated on a substrate to form a sorbent layer thereon.

19. A method according to claim 16, wherein the porous material is coated on a substrate before immobilizing the at least one amine and the at least one carbon dioxide activating catalyst thereon.

20. A method according to claim 16, further comprising:
A) forming a slurry of the porous material, a solvent, and a binder,
B) applying said slurry to a substrate, followed by drying, and then calcining at a temperature of 200-1000° C.,
C) impregnating the at least one amine and the at least one carbon dioxide activating catalyst onto the porous material, and
D) drying said substrate to obtain said sorbent material.

21. A method according to claim 16, comprising the steps of
A) wet impregnating the at least one carbon dioxide activating catalyst on the porous material,
B) drying the porous material,
C) forming a slurry of said porous material, a solvent, and a binder,
D) applying said slurry to a substrate,
E) drying said substrate followed by calcining the substrate at a temperature of 200-1000° C. to immobilize the porous material thereon,
F) wet impregnating the at least one amine on the porous material immobilized onto the substrate, and
G) drying the substrate to obtain said sorbent material.

22. A method of forming a sorbent material adapted for reversible absorption of carbon dioxide in an absorption vessel through which a process gas generated during the combustion of a fuel may be forwarded, said method comprising forming said sorbent material by immobilizing at least one amine on at least one porous material comprising a carbon dioxide activating catalyst.

23. A method of removing carbon dioxide from a process gas generated during the combustion of a fuel, said method comprising:
bringing the process gas into contact with a sorbent material which is operative for reversibly collecting carbon dioxide from the process gas, and
wherein said sorbent material comprises at least one amine, at least one carbon dioxide activating catalyst, and at least one porous material supporting the at least one catalyst and the at least one amine, such that carbon dioxide is absorbed by said at least one amine under the influence of said at least one carbon dioxide activating catalyst.

* * * * *